3,523,025
RICE PROCESSING
Flann A. McGinley, Dublin, Ireland, assignor to Irish Sugar Company, Limited, Dublin, Ireland, an Irish company
No Drawing. Filed Apr. 27, 1967, Ser. No. 634,087
Claims priority, application Great Britain, June 29, 1966, 29,102/66
Int. Cl. A23l *1/10*
U.S. Cl. 99—83                            4 Claims

ABSTRACT OF THE DISCLOSURE

Preparation of cooked rice having substantially no free starch content and having improved color by the addition of a starch complexing agent and a chelating agent to the rice during the cooking process.

---

The present invention relates to the processing of rice and in particular to the preparation of cooked rice.

Processes for the preparation of cooked rice in a dried form requiring little or no further treatment to render it into a readily consumable product, i.e., so called "quick cooking" rices are known. In such processes the rice is soaked for various lengths of time to increase the moisture contents of the grain to 20–30%, and gelatinised by cooking in steam or water at a temperature ranging from about 87° to 100° C., until cooking is complete. Excess starch is washed off the cooked grains with cold water.

These processes suffer from the disadvantage that during processing, the presence of oxidisable iron in the cooking system results in the development of greyness in the final product. Furthermore, the presence of residual free starch, even after washing, on the surface of the rice grains results in matting and adhesion of the product during subsequent drying.

It is an object of the present invention to substantially overcome these above mentioned disadvantages.

Accordingly, the present invention is a process for the preparation of cooked rice which comprises cooking raw polished rice in water for sufficient time to increase the moisture content to about 25–30% by weight based on the weight of the rice, adding a chelating agent and a starch complexing agent to the water and simmering the mixture until the moisture content of the rice is increased to about 65% by weight, treating the cooked rice with dry steam to complete starch gelatinisation, washing to remove free starch and drying the product.

The initial cooking of the raw polished rice is preferably carried out over an extended period of time, e.g., about 2 to 4 hours at a medium temperature such as 50° C.

The chelating agent may be any suitable compound, e.g. sodium acid pyrophosphate, and may be added to the water in amounts ranging from 0.05 to 0.5% by weight based on the weight of the raw polished rice. The effect of the chelating agent is to produce a higher degree of whiteness in the final product.

The starch complexing agent may suitably be a monoglyceride or mixture of monoglycerides and may be added to the water in amounts ranging from 0.1 to 1.0% by weight based on the weight of the raw polished rice. This agent complexes surface starch and thus reduces the tendency of the rice to matt together during subsequent drying. A preferred starch complexing agent is glyceryl mono stearate.

Simmering of the aqueous mixture of rice, chelating agent and starch complexing agent may be effected at about 94–100° C. for a time sufficient to increase the moisture content of the rice to about 65% by weight, e.g., in general about 6 minutes.

Treatment of the cooked rice with dry steam is preferably effected with dry steam under atmospheric pressure so that whilst starch gelatinisation is completed there is no further increase in the moisture content of the starch at this stage.

Washing of the cooked rice is carried out preferably with cold water in order to remove free starch. After washing, the rice is dried, e.g., loaded onto drying trays and dried with air at a temperature ranging from 60 to 100° C. to a moisture content of about 8 to 16% by weight.

Preferably the final dried product is submitted to a mild mechanical pressure for example by passing the rice between two opposing rubber surfaced rollers set apart by a gap of say ¼ to 1¼″. This pressure has the effect of crushing any loose aggregates formed during drying, reducing them to discrete rice grains.

I claim:

1. A process for the preparation of cooked rice which comprises the steps of cooking raw polished rice in water for sufficient time to increase the moisture content to about 25 to 35% by weight based on the weight of the rice, adding a chelating agent in amount ranging from 0.05 to 0.5% by weight and of a starch complexing agent in amount ranging from 0.1 to 1.0% by weight based on the weight of the raw polished rice to the water and simmering the mixture until the moisture content of the rice is increased to about 65% by weight, treating the cooked rice with dry steam to complete starch gelatinisation, washing to remove free starch and drying the product.

2. A process for the preparation of cooked rice which comprises the steps of cooking raw polished rice in water for about 2 to 4 hours at a temperature about 50° C., to increase the moisture content to about 25–30% by weight based on the weight of the rice, adding a chelating agent in amount ranging from 0.05 to 0.5% by weight based on the weight of the raw polished rice and a starch complexing agent in amount ranging from 0.1 to 1.0% by weight of the raw polished rice to the water and simmering the mixture at about 94–100° C. until the moisture content of the rice is increased to about 65% by weight, treating the cooked rice with dry steam to complete starch gelatinisation, washing to remove free starch and drying the product in air at a temperature ranging from 60 to 100° C. to obtain a moisture content of 8 to 16% by weight based on the final dried cooked rice product.

3. A process for the preparation of cooked rice as claimed in claim 2 wherein the chelating agent is sodium acid pyrophosphate.

4. A process for the preparation of cooked rice as claimed in claim 2 wherein the starch complexing agent is glyceryl mono stearate.

References Cited

UNITED STATES PATENTS

| | | | |
|---|---|---|---|
| 2,890,957 | 6/1959 | Seltzer | 99—80 |
| 3,049,427 | 8/1962 | Fellers et al. | 99—154 |
| 3,113,868 | 12/1963 | Lee | 99—83 |

LIONEL M. SHAPIRO, Primary Examiner

J. R. HOFFMAN, Assistant Examiner

U.S. Cl. X.R.

99—80